United States Patent [19]

Niessner

[11] 3,998,009
[45] Dec. 21, 1976

[54] FRAMELESS WINDOW SASH CONSTRUCTION FOR MOTOR COACHES AND THE LIKE

[75] Inventor: Adam Niessner, Winnipeg, Canada
[73] Assignee: Motor Coach Industries Limited, Winnipeg, Canada
[22] Filed: Jan. 13, 1976
[21] Appl. No.: 648,625
[52] U.S. Cl. .............................................. 49/394
[51] Int. Cl.² ....................................... E05C 19/00
[58] Field of Search ............ 49/141, 348, 349, 381, 49/394, 413, 440, 449

[56] References Cited
UNITED STATES PATENTS

| 3,490,176 | 1/1970 | Danois | 49/413 |
| 3,541,732 | 11/1970 | Hanson | 49/440 |
| 3,591,983 | 7/1971 | Hanson | 49/375 |
| 3,770,312 | 11/1973 | Shadburn | 49/394 |

Primary Examiner—Peter M. Caun
Attorney, Agent, or Firm—Stanley G. Ade

[57] ABSTRACT

A sheet of tempered glass, laminated glass or clear plastic forms a frameless window panel. Hinges and catch plates and pull handles are bolted adjacent the perimeter of the sheet through shock absorbing bushings with the sheet sealing against flexible sealing means secured around the window opening thus eliminating all frame members for the panel and reducing the weight of a conventional window by approximately 35% to 40%.

2 Claims, 2 Drawing Figures

FRAMELESS WINDOW SASH CONSTRUCTION FOR MOTOR COACHES AND THE LIKE

BACKGROUND OF THE INVENTION

This invention relates to new and useful improvements in window constructions particularly designed for motor coaches and the like.

Conventionally such window constructions consist of a sheet of glass or plastic enclosed within a relatively heavy frame which in turn is hinged to the window opening and is clamped into the closed position by means of detachable latches and the like.

Such windows are often used as escape hatches and together with other faults, are relatively heavy making it difficult to hold the window open in the case of an emergency.

Furthermore such conventional windows are relatively expensive due to the large number of parts required to provide a window construction which can be sealed yet can rapidly be opened when desired.

SUMMARY OF THE INVENTION

The present invention overcomes these disadvantages by utilizing a planar panel of clear plastic, laminated glass or tempered glass without a surrounding frame and in which the hinge and catch plates are bolted through shock absorbing bushings to the panel inboard of the edges thereof. The panel is snugged against a flexible seal thus eliminating drafts and the like and is readily opened and held in the open position in the event of an emergency.

The principal object and essence of the invention is therefore to provide a device of the character herewithin described in which the transparent window panel consists of a planar sheet of tempered glass, laminated glass or plastic without a surrounding frame thus effecting a considerable reduction in weight from conventional windows.

Another object of the invention is to provide a device of the character herewithin described which provides a cost saving because of the reduction of the number of pieces of parts forming the construction.

Yet another object of the invention is to provide a device of the character herewithin described in which relatively thick clear plastic can be used for the window paneling or, alternatively, a thinner sheet of tempered glass or laminated glass can be used. In the event of plastic, the use of an insulated window is eliminated because the relatively thick plastic forms a good thermal barrier.

Yet another object of the invention is to provide a device of the character herewithin described in which the frameless window provides an increased area of clear vision from the inside of the motor coach and provides a more esthetic pleasing appearance from the exterior thereof.

Still another object of the invention is to provide a device of the character herewithin described in which the window sash unit is relatively lightweight and is therefore easier to hold open in an emergency in order to provide a means of escape.

A still further object of the invention is to provide a device of the character herewithin described which, because of the lighter weight, eliminates wear on the upper hinge pins due to vibrations and rattling.

A still further object of the invention is to provide a device of the character herewithin described in which the lock keepers and window pulls are incorporated in an integral unit and furthermore as there are no steel screws holding an aluminum frame together, galvanic corrosion is eliminated.

Still another object of the invention is to provide a device of the character herewithin described which eliminates the possibility of leaks because the window panel is snugged directly against the flexible seal.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
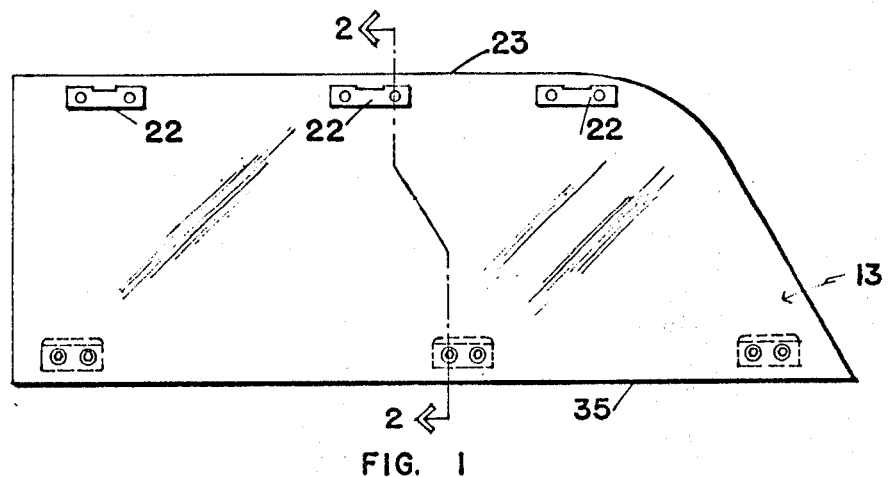
FIG. 1 is a front elevation of one embodiment of the window panel per se.
Figure 2:
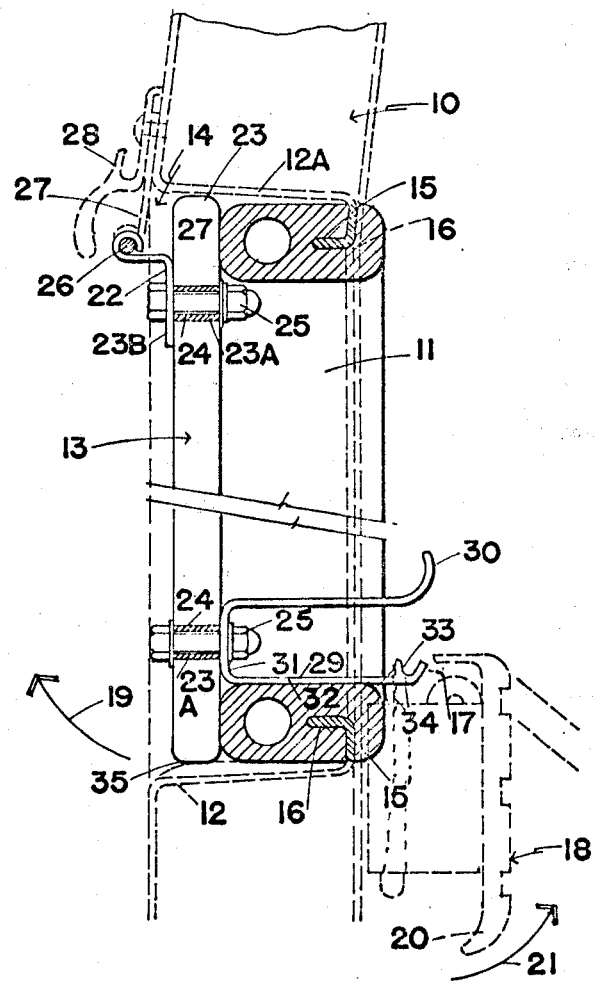
FIG. 2 is a cross sectional view of the window panel in FIG. 1 along the line 2—2 showing a cross section of the window frame in phantom.

Proceeding therefore to describe the invention in detail, reference should be made to the drawings in which 10 illustrates the wall of a motor coach and the like having an aperture 11 formed therein with the edges 12 of the aperture defining a window opening.

A window panel collectively designated 13 is hinged to the upper edge 12A of the window opening by means of a hinged component collectively designated 14 and, when in the closed position, registers against a flexible seal 15 of rubber or the like which extends all around the window opening and is secured to a flange portion 16 thereof in the usual way.

A latch mechanism 17 is provided which latches the window panel in the closed position and a release bar assembly 18 of conventional construction, is provided to release the latch mechanism so that the window can be pushed open in an upward direction as indicated by arrow 19. In this regard, the release 20 of the latch assembly is moved from the position shown in phantom, in the direction of arrow 21 to effect the release.

In detail the window panel generally designated 13 is formed with a configuration to suit the window opening, of a clear plastic, a relatively thin tempered glass or laminated glass depending upon design parameters.

It is a substantially planar panel and is provided with upper hinge plates 22 in spaced apart relationship along the upper edge 23 thereof but spaced inwardly therefrom.

In this regard, apertures 23A are formed through the panel and a shock absorbing bushing 24 engages the apertures. The lower hinge leaf or plate 22 is provided with a planar portion 23B and nut and bolt means or similar fastening means 25 extends through this planar portion, and through the shock absorbing bushing 24 thus holding the hinge portions 22 firmly against the panel as clearly shown.

A hinge pin 26 extends through the sleeve portion 27 of the hinge plate 22 and connects the hinge plate to the upper plate portion 27 which is secured to the wall 10 spaced from the edge 12A. In this regard a drip moulding 28 may be provided in the usual way.

The latch or catch assembly 17 includes a combination plate portion 29 having a pull handle 30 formed thereon and a planar portion 31 extending at an angle from the pull handle portion. A further portion 32 is provided substantially parallel with the main handle portion 30 and a latch catch 33 is formed towards the distal end of this portion 32. A conventional spring loaded latch 34 extends upwardly from the release assembly 18 and engages through an aperture and is held against the latch 33 in the usual manner when the window panel is in the closed position.

This component 29 is fastened to the panel 13 in a manner similar to the securement of the hinge plate 22 and is also spaced upwardly from the opposite or lower edge 35 of the panel.

In operation, the relative lightweight panel is easily opened and closed and held firmly against the seal 15 when in the closed position.

Although the glass or plastic panel 13 may be transparent, nevertheless it will be appreciated that it may be tinted if necessary without departing from the spirit and scope of the invention.

Also it will be appreciated that although the window is shown hinged along the horizontal upper edge 12A of the window opening, nevertheless it can also be hinged by one of the vertical sides if this particular design is required.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A frameless window panel comprising a substantially planar frameless sheet of window material, hinge plates secured adjacent one edge thereof and spaced inwardly therefrom and catch plates secured to an opposite edge thereof and spaced inwardly therefrom, and at least one pull handle secured to said panel adjacent said opposite edge, the portions of said hinge means and the portion of said detachable latch means secured to said window panel including planar portions, a shock absorbing bushing extending through apertures formed through said panel and fastening means extending through said hinge plate and said bushing adjacent said hinge plate and further fastening means extending through said catch plate and said bushing adjacent said catch plate.

2. A window construction for motor coaches and the like which include a window opening formed in the wall thereof with the window opening being substantially rectangular and being defined by the edges of the wall surrounding the opening; said window construction comprising in combination a substantially planar frameless sheet of window material, a flexible seal secured to the edges of the wall defining the window opening, a hinge means operatively secured to adjacent one edge of said wall and to adjacent one edge of said window panel and detachable latch means operatively secured to the opposite edge of said wall and adjacent to the opposite edge of said panel, the portions of the hinges and the latch means secured to said window panel being spaced inwardly from the adjacent edges of said panel, the portions of said hinge means and the portion of said detachable latch means secured to said window panel including planar portions, a shock absorbing bushing extending through apertures formed through said panel and fastening means extending through said hinge plate and said bushing adjacent said hinge plate and further fastening means extending through said catch plate and said bushing adjacent said catch plate.

* * * * *